May 21, 1957  J. E. WHITFIELD  2,792,763
METHOD AND MACHINE FOR FORMING ROTORS
Filed Feb. 9, 1950  10 Sheets-Sheet 1

INVENTOR.
JOSEPH E. WHITFIELD
BY Otto Moeller
Attorney

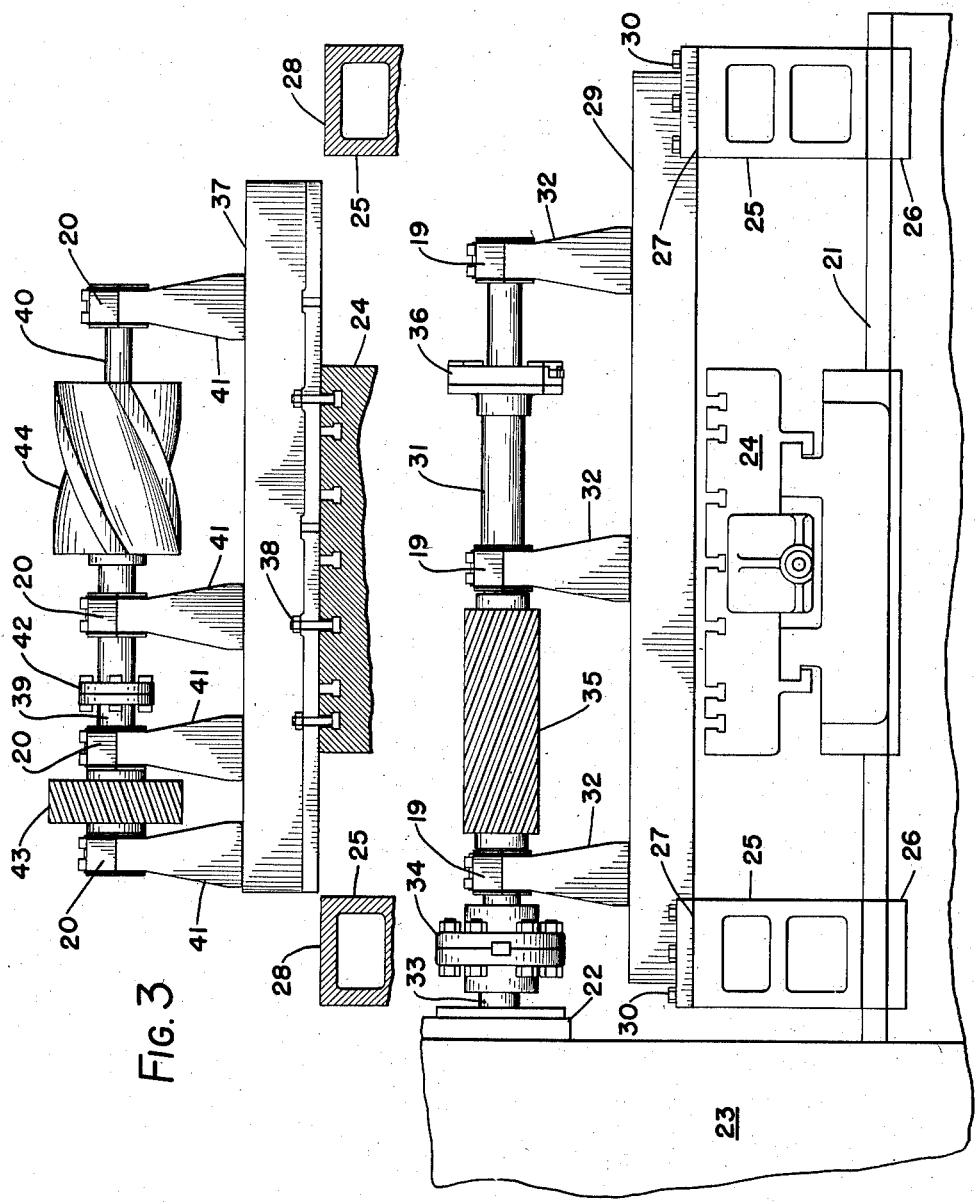

May 21, 1957  J. E. WHITFIELD  2,792,763
METHOD AND MACHINE FOR FORMING ROTORS
Filed Feb. 9, 1950  10 Sheets-Sheet 3

INVENTOR.
JOSEPH E. WHITFIELD
BY
Otto Moeller
Attorney

May 21, 1957    J. E. WHITFIELD    2,792,763
METHOD AND MACHINE FOR FORMING ROTORS
Filed Feb. 9, 1950    10 Sheets-Sheet 4

INVENTOR.
JOSEPH E. WHITFIELD
BY
Otto Moeller
Attorney

May 21, 1957  J. E. WHITFIELD  2,792,763
METHOD AND MACHINE FOR FORMING ROTORS
Filed Feb. 9, 1950  10 Sheets-Sheet 5
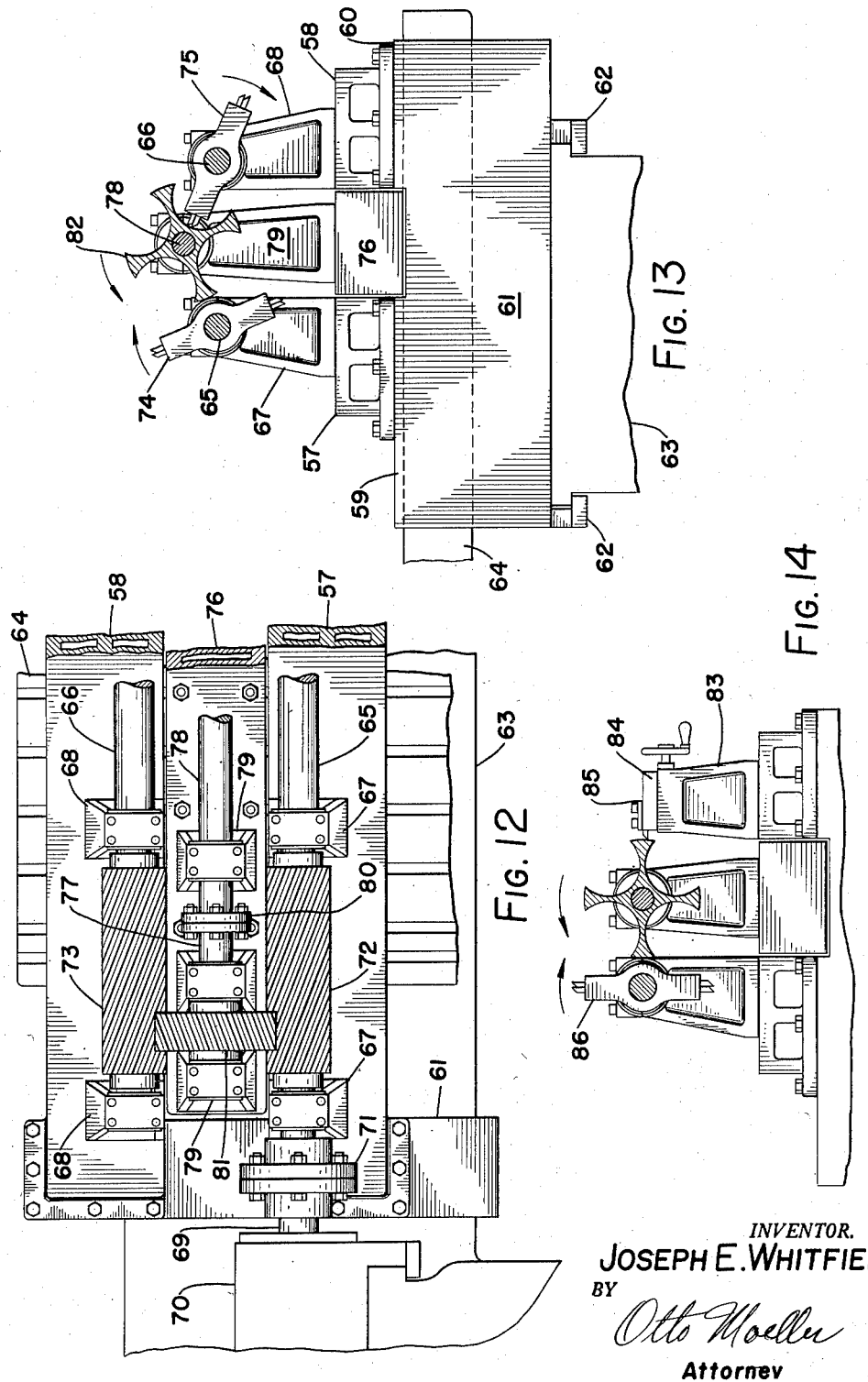
INVENTOR.
JOSEPH E. WHITFIELD
BY
Otto Moeller
Attorney INVENTOR.
JOSEPH E. WHITFIELD
BY
Otto Moeller
Attorney

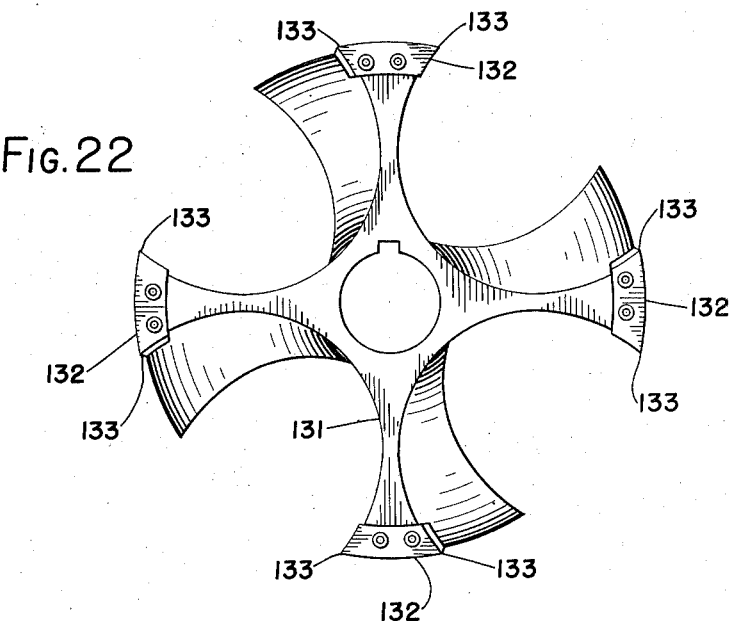
Fig. 22
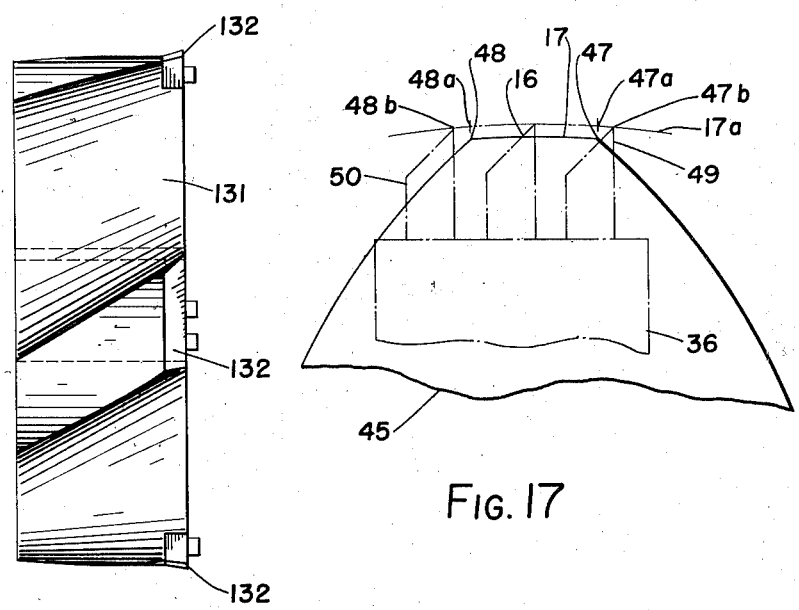
Fig. 23
Fig. 17
INVENTOR.
JOSEPH E. WHITFIELD
BY
Otto Moeller
Attorney

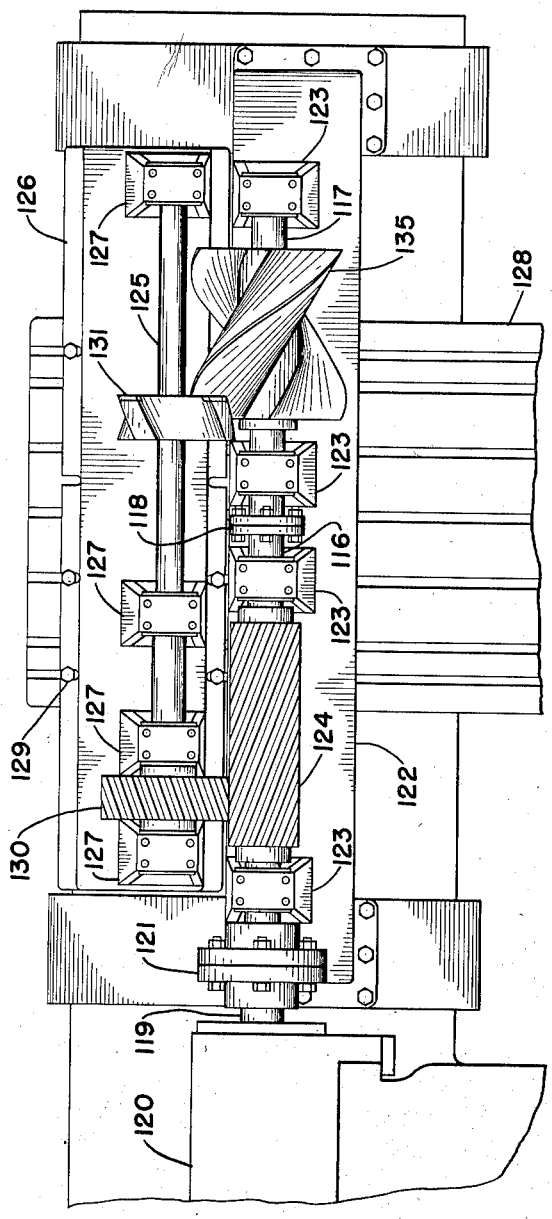

May 21, 1957  J. E. WHITFIELD  2,792,763
METHOD AND MACHINE FOR FORMING ROTORS
Filed Feb. 9, 1950  10 Sheets-Sheet 10

INVENTOR.
JOSEPH E. WHITFIELD
BY
Otto Moeller
Attorney

United States Patent Office 2,792,763
Patented May 21, 1957

2,792,763
METHOD AND MACHINE FOR FORMING ROTORS

Joseph E. Whitfield, Erie, Pa., assignor, by mesne assignments, to Capitol Products Corporation, Mechanicsburg, Pa., a corporation of Pennsylvania Application February 9, 1950, Serial No. 143,259

4 Claims. (Cl. 90—3)

This invention relates to improvements in the method and apparatus for forming spiral generated shapes and more particularly for forming the male and female rotors of a blower, compressor and the like such as described, for example, in my U. S. Patent No. 2,287,716.

Axial flow fluid devices of the type to which the said patent is predicated are provided with complementary intermeshing rotary screw members commonly referred to as the main or male rotor and the gate or female rotor, the former generally having a fully addendum thread and the latter a fully dedendum thread. The main rotor preferably has two lobes and the gate rotor four threads forming trough or grooves. Other combinations of lobes and troughs may however, be employed.

These rotors have symmetrical generated thread forms, the curved flanks of the lobes of the main rotor being described by the continuous crest edges of the threads of the gate rotor and the curved flanks of the troughs of the gate rotor being described by the continuous crest edges of the lobes of the main rotor.

The main object of this invention is to provide an improved method and machine for cutting the generated flanks of rotors of the type above described with greater accuracy, greater speed and at less cost than is possible by other known methods and machines.

Another object is to provide a method and machine for forming the flanks of such rotors by generation with cutters that have relative longitudinal movement with respect to the blank and in which the cutter and blank rotate in timed relation, with the cutter intermeshing with the blank in the same manner as the rotors engage while in actual operation.

Another object of the invention is the provision of a method and machine for concurrently cutting a plurality of generated rotor threads during one relative longitudinal traverse of the cutters and blank.

Another object of the invention is the provision of a method and machine of the type described that during one relative longitudinal traverse of the cutters and blank, concurrently rough and finish cuts a plurality of generated gate rotor grooves or troughs.

Another object of the invention is the provision of a method and machine of the type described that during one relative longitudinal traverse of the cutters and blank, concurrently generates the gate rotor grooves or troughs and turns the outside diameter of the rotor.

Another object of the invention is the provision of a method and machine of the type described that concurrently cuts the generated grooves or troughs of a pair of gate rotors.

Another object of the invention is the provision of a method and machine that will simultaneously cut a generated thread form of a male and a female gate rotor during one relative longitudinal traverse of the cutters and blanks.

Another object of the invention is to provide a novel gate rotor having its generated trough contour formed to provide between the generated flanks of the gate rotor trough and the generated flanks of the meshing main rotor threads a tapered clearance extending from the crest edges of the gate rotor to the bottom of the rotor trough.

Other objects and advantages of the invention will become apparent from the following description when read in connection with the accompanying drawings, in which Figure 1 is a fragmentary plan view of a boring mill embodying a form of my invention for cutting a single gate rotor;

Figure 2 is a fragmentary side elevation of the structure shown in Figure 1 with the rotor carrying support and brackets removed;

Figure 3 is a section taken on the line 3—3 of Figure 1;

Figure 12 is a fragmentary plan view of a modification of the invention for concurrently rough and finish cutting a complete gate rotor in a single traverse of the blank with respect to the cutting tools, showing the driving arrangement;

Figure 13 is an end elevation of the machine supplementing Figure 12 and viewed from the right, showing the arrangement of the rotor blank and cutting tools;

Figure 14 is an end elevation of a modified form of the invention showing an arrangement for concurrently cutting the generated troughs and turning the outside diameter of the gate rotor in a single traverse of the blank with respect to the cutting tools;

Figure 24:
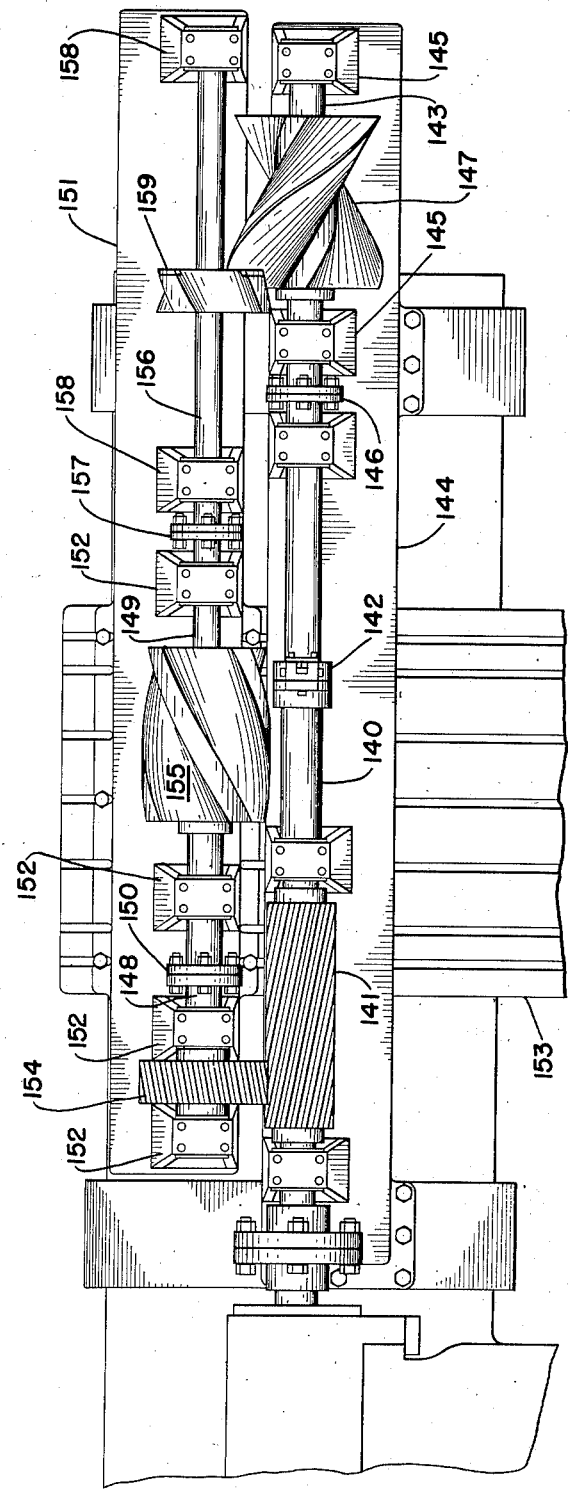
Figure 26:
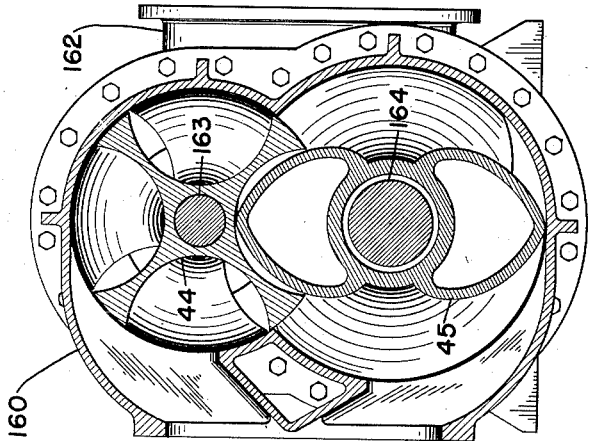
Figure 25:
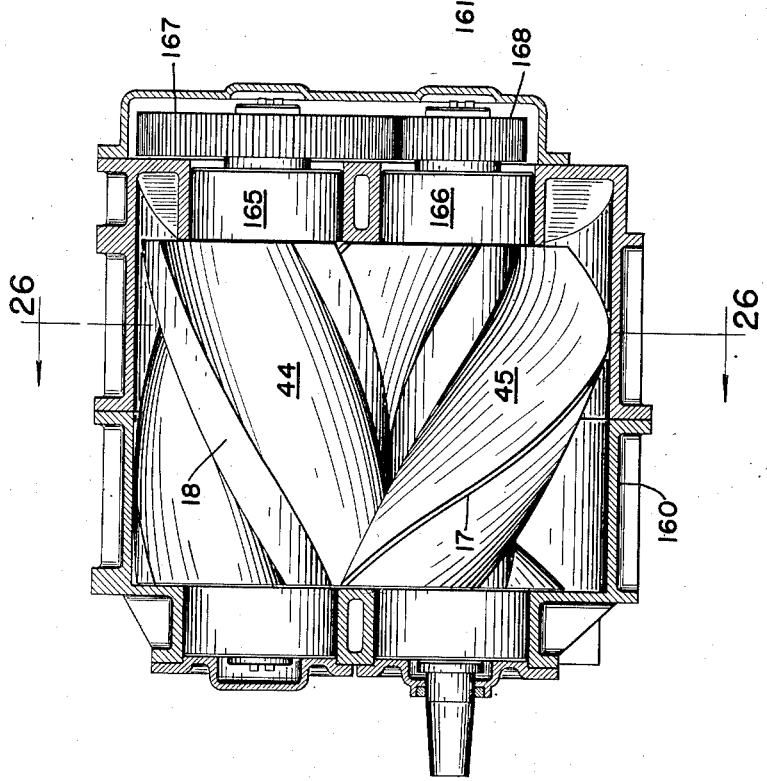

Figure 17 is an enlarged fragmentary diagrammatic view of a main rotor showing the relation of the cutting tools with respect to the crest edge of the main rotor for generating the trough of a mating gate rotor, the relation of the points of the cutting tools with respect to the crest edge of the main rotor for obtaining desired clearances between the gate rotor and the main rotor being exaggerated;

Figure 18 is a fragmentary plan view of a boring mill embodying my invention, adapted for cutting a main rotor;

Figure 19 is a diagrammatic view illustrating the relative positions of the cutting tool and main rotor blank at the beginning of their generating cuts;

Figure 20 is a view similar to Figure 19 showing the cutting tools in the center of their generating cuts;

Figure 21 is a view similar to Figure 19 showing the cutting tools approaching the end of their generating cuts;

Figure 22 is a front view in elevation of main rotor generating tool;

Figure 23 is a side view of the tool shown in Figure 22;

Figure 24 is a fragmentary plan view of a boring mill embodying by invention, adapted for simultaneously cutting a female or gate rotor and a male or main rotor;

Figure 25 is a longitudinal vertical central section through a blower housing with the rotors assembled therein and shown in elevation; and Figure 26 is a sectional view taken on the line 26—26 of Figure 25.

Referring to the drawings, Figures 1 to 4 inclusive show the novel rotor machining fixture attached to a horizontal boring mill having a bed portion 21, a head stock 22, a head stock supporting column 23 and a table 24 adapted for longitudinal movement along the bed portion 21. The mechanism for longitudinally moving the table 24 either in increments or continuously, representing the feed of the work to be machined, is conventional and therefore not shown and the rate of feed may be varied in any known manner. Cross supports 25 are clamped to ways formed on the bed portion 21 with clamp plates 26. The cross supports 25 are formed with top surfaces 27 and 28, the top surfaces 27 being higher than the top surfaces 28. The top surfaces 27 of the cross supports 25 are above the level of the top of the movable table 24, and the top surfaces 28 of the cross supports 25 are below the level of the top of the movable table 24.

A support member 29 is fastened on the top surfaces 27 of cross supports 25 with bolts 30 and clears the top of the movable table 24 as best shown in Figure 2. A boring bar or shaft 31 is carried over the member 29 on brackets 32 secured in any suitable manner on the member 29 and is connected to a drive spindle 33 in the boring head 22 by a coupling 34. Mounted on the boring bar 31 is a boring head 36 and a helical pinion 35, the latter having the same helix angle and opposite hand as the rotor threads desired to be cut.

Another support member 37 is carried on the movable table 24 and is secured to the table with T-bolts 38. Driven shaft 39 and shaft or arbor 40, connected together by a coupling 42, are carried over the member 37 on brackets 41 secured in any suitable manner on the member 37. Mounted on shaft 39 is a helical gear 43 adapted to mesh with the helical pinion 35 on the boring bar 31. The helical gear 43 has the same helix angle and is of the same hand as the rotor threads to be cut. Arbor 40 is formed to receive a gate rotor blank 44 arranged to rotate in timed relation with respect to rotation of the boring head 36 as hereinafter explained. The brackets 32 and 41 have removable caps 19 and 20, respectively, to permit removal of the boring bar 31, driven shaft 39 and arbor 40 for changing helical gears and receiving rotor blanks for machining.

Figure 7:
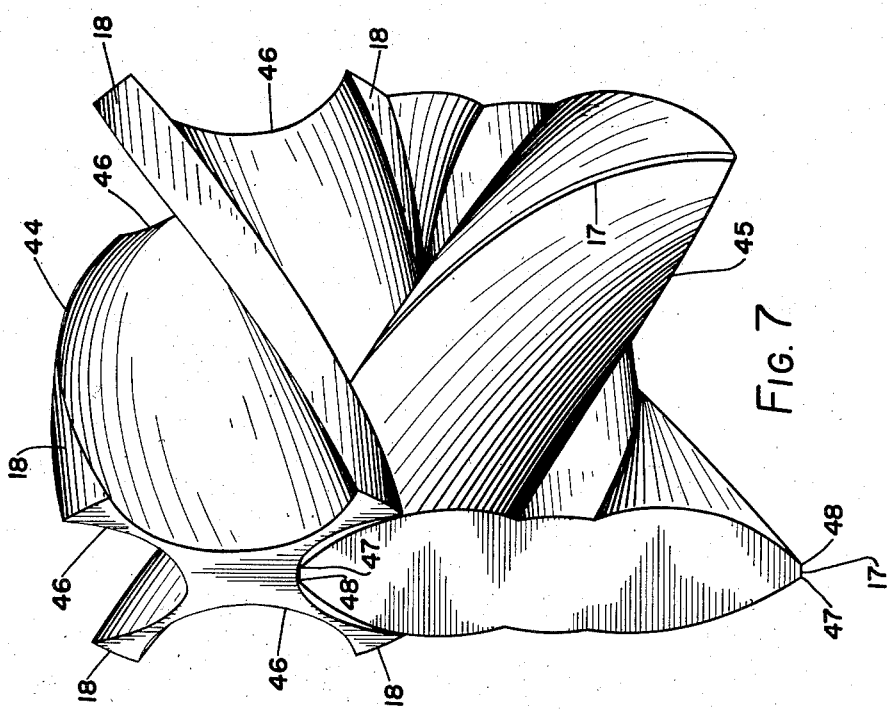
Figure 7 is a view in perspective of the gate rotor and main rotor in mesh.

One form of rotor which this fixture is adapted to machine is the gate rotor 44 shown with its mating main rotor 45 in Figure 7. The general contour of the troughs 46 in the gate rotor 44 is determined or generated by the path followed by the crest edges 47 and 48 on the main rotor 45 as the rotors rotate in timed relation. Actually the contour of the troughs 46 of the rotor 44 varies from a true generation by the crest edges 47 and 48 to provide necessary running clearance between the perimetral surface or crest 17 of the main rotor and the flanks of the troughs 46 of the gate rotor. Preferably, though not necessarily, the contour of the troughs 46 of the rotor 44 is further modified from a true generation by the crest edges 47 and 48 to provide a gradually expanding clearance between the crest 17 of the main rotor 45 and the flanks of the troughs 46 of the gate rotor 44 extending from the bottom of the troughs to the crests 18 to allow for the torsional resilience at the timing gear end of the gate and main rotor shafts, backlash in the timing gears and any other distortions encountered in the operation of a blower or pump comprising helical intermeshing rotors such as shown in Figures 25 and 26. The gate rotor 44 and the means and method for forming it will be hereinafter described in greater detail.

Referring specifically to Figures 25 and 26, the housing 160 for the meshing rotors 44 and 45 is provided at diagonally opposite ends with a fluid inlet port 161 and a fluid outlet port 162. One end of the shafts 163 and 164 of the rotors 44 and 45, respectively, extend beyond their bearings 165 and 166, respectively, and have the timing gears 167 and 168, respectively, secured thereto, the ratios of which are selected to maintain the gate rotor 44 and the main rotor 45 in their proper timed relation. In the present instance the gear ratio shown is two to one.

The largest amount of distortion takes place after the main rotor and the gate rotor pockets are closed to the inlet port and when the compression of the fluid trapped in said pockets has reached its maximum before the pockets open to the discharge port. The forces exerted against the pressure of the fluid in said pockets by the driving means causes the rotor shafts to twist slightly between the ends of the rotors and the timing gears, in consequence of which the forward flanks of the main rotor timing gear teeth press against the rear flanks of the gate rotor timing gear teeth. When the rotor pockets open to the outlet port and the pressurized fluid is exhausted through said port the rotor shafts return to their normal condition and the rear flanks of the main rotor timing gear teeth snap back against the forward flanks of the gate rotor timing gear teeth. This action of the rotor shafts and timing gears during the compression and exhausting cycles of the blower causes the gate rotor to be slightly out of its timed relation with the main rotor and provision must be made in the clearances between the troughs of the gate rotor and the crests of the main rotor to prevent any contact between the two rotors during these cycles.

The distortions caused by the torsional resilience and the gear backlash is preferably provided for by having a gradually expanding clearance between the crest 17 of the main rotor 45 and the flanks of the trough 46 of the gate rotor 44, with the maximum clearance at the top of the trough and the minimum running clearance at the bottom of the trough. This is best shown in an exaggerated section of a trough in the gate rotor in Figure 11 in which the trough is defined by the lines 51 and 55 and the path followed by the crest 17 of the main rotor is defined by the double dot and dash lines 56.

Figure 9:
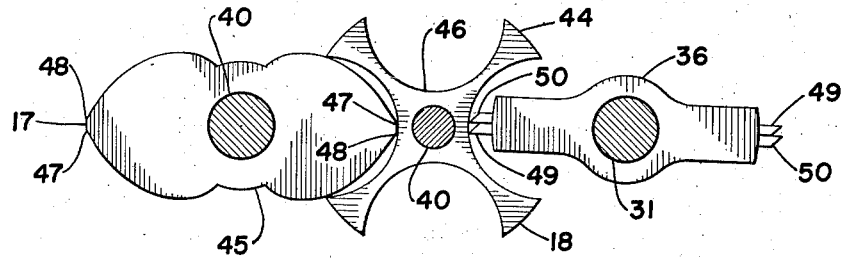
Figure 9 is a view similar to Figure 8 showing the cutting tool in the center of a generating cut.

Torsional distortion of the rotor shafts and backlash in the timing gears does not affect the clearance between the crest of the main rotor and the bottom of the trough of the gate rotor when in juxtaposition as shown in Figure 9 and therefore the troughs of the gate rotor are preferably formed, as later described, to provide a minimum running clearance between the crests of the main rotor and the bottom of the gate rotor troughs. Such torsional distortion and backlash does, however, effect a progressively greater variance in clearance between the crest 17 of the main rotor and the trough of the gate rotor outwardly along the flank of the gate rotor trough from the bottom of the trough to its crest 18, and the flanks of the gate rotor trough are therefore preferably formed to provide a progressively greater clearance between the crest of the main rotor and the flanks of the gate rotor trough outwardly along the said flanks from the bottom of the trough to its crests 18. For example, the gate rotor may be formed to provide a clearance of .005 between the crest of the main rotor and the bottom of the gate rotor trough increasing to .010 between the crest of the main rotor and the flank of the gate rotor trough adjacent the crests 18.

The importance of the tapered clearance thus provided by the contour of the gate rotor trough lies in the fact that clearance between the crest of the main rotor and the gate rotor trough varies as the necessity for clearance varies due to the aforesaid distortion, and a minimum practical clearance is provided, resulting in a minimum of leakage of fluid and thereby providing a more efficient blower.

The machining of a groove that will provide the aforesaid tapered clearance is accomplished by setting the tool bits 49 and 50 in the boring head 36 with the distance between the center of the shaft 31 and the cutting points of the tool bits 49 and 50 being equal to the distance between the center of the main rotor 45 and its crest edges 47 and 48, plus the desired minimum running clearance between the main rotor crest and the bottom of the gate rotor trough, and making the distance between the cutting edges of the tool bits 49 and 50 slightly greater than the distance between crest edges 47 and 48 of the main rotor. This adjustment of the distance between the edges of the tool bits 49 and 50 controls the amount of the tapered clearance between the main rotor and the gate rotor.

The relation of the tool bits 49 and 50, for cutting the gate rotor trough, with respect to the main rotor that is intended to mesh with the gate rotor is best illustrated in the exaggerated diagrammatic view, designated as Figure 17. The points of the tool bits 49 and 50 are shown extending a radial distance outward beyond the crest 17 of the main rotor 45 in order to provide a running clearance between the crest of the main rotor and the trough of the gate rotor. The points of the tool bits 49 and 50 are also clearly shown to be spread farther apart than the crest edges 47 and 48 of the main rotor whereby the gate rotor trough cut by the tool bits 49 and 50 provides the aforesaid tapered clearance when the main rotor is arranged in meshing engagement with the gate rotor. Additional cutting tools may be disposed between the cutting bits 49 and 50 if the distance between them permits, one such cutting tool being shown at 16 in Figure 17.

Enlarging somewhat on the above, assuming the tool bits 49 and 50 are extended a radial distance outward beyond the crest 17 to the concentric arc 17a and spaced apart a distance equal to the distance between the crest edges 47 and 48, represented in Figure 17 by the points 47a and 48a. In this event, because of the angularity of the tool with respect to the surface being cut, the depth of the cut will be greater at the bottom of the gate rotor trough than upwardly along the flanks of the trough. This will become apparent upon comparing Figures 8 and 9 or Figures 9 and 10

By spacing the tool bits 49 and 50 circumferentially farther apart than the crest edges 47 and 48, for example, at points 47b and 48b on the arc 17a, the depth of the cut at the bottom of the gate rotor trough does not change but the depth of the cut along the flanks of the trough becomes greater. Thus by altering the radial projection of the tool bits and their circumferential spacing, the gate rotor troughs may be formed to provide a desired clearance between the crest of a main rotor and the flanks as well as the bottom of the trough of a mating gate rotor.

Figure 8:
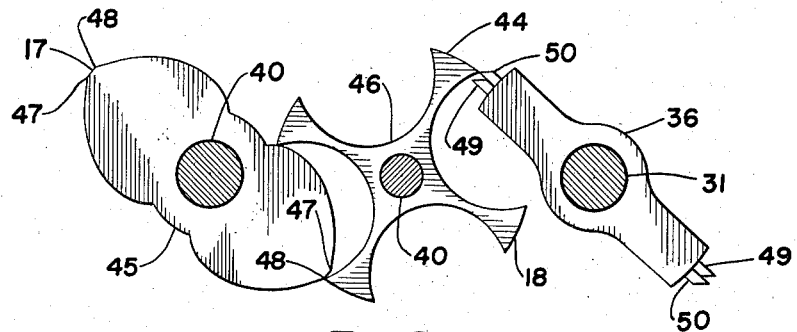
Figure 8 is a diagrammatic view illustrating the relative positions of the cutting tool and gate rotor blank at the beginning of a generating cut, the main rotor also being shown to illustrate how the rotation of the cutting tool simulates the action of the main rotor while the gate rotor is being generated by the cutting tool.
Figure 10:
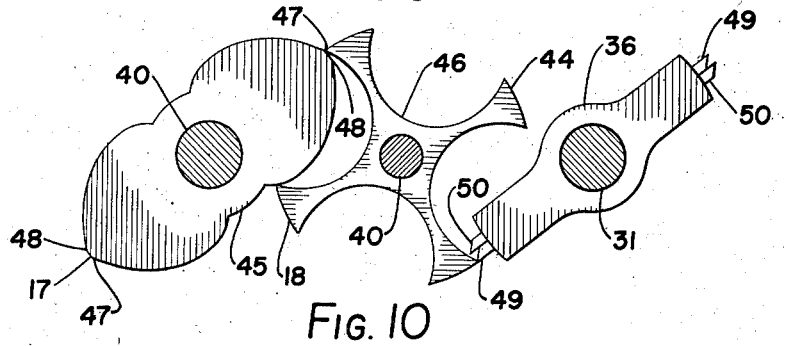
Figure 10 is a view similar to Figure 8 showing the cutting tool nearing the end of a generating cut.

Figures 8, 9 and 10 show the cutting tools in three positions passed through during the machining of a trough and the main rotor in like positions, the arrows indicating the direction of rotation. In Figure 8 the crest edge 48 of the main rotor is entering the trough of the gate rotor and the tool bit 50 has started its cut. Figure 9 shows the main rotor 45 with crest edges 47 and 48 in the center of the trough of the gate rotor 44 and tool bit 50 about to finish its cut and tool bit 49 starting to cut. Figure 10 shows the crest edge 47 of the main rotor 45 leaving the trough in the gate rotor 44 and tool bit 49 finishing its cut. From these illustrations it may be seen that the path followed by the edges 47 and 48 of the main rotor 45 may be duplicated as closely as desired with the tool bits 49 and 50 in the boring head 36.

Figure 11:
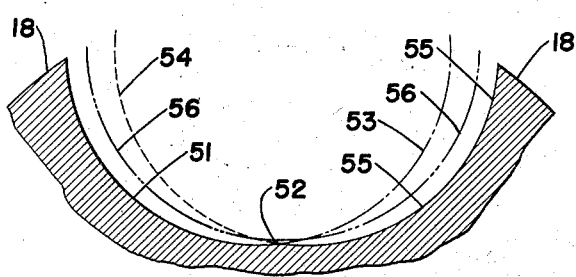
Figure 11 is an exaggerated view of the contour of the trough of the gate rotor, showing the paths of the cutting edges of the tools in forming a generated gate rotor trough, and the path of the crest edges of a mating main rotor showing a tapered clearance between the crest edges of the main rotor and the flanks of the gate rotor troughs.

Figure 11 shows an exaggerated diagram of the path followed by the cutting edges of the tool bits 49 and 50. Tool bit 50 follows the solid line 51 and cuts to point 52 and follows dot and dash line 53 relative to the gate rotor until it leaves the trough. Tool bit 49 enters the trough and follows the dotted line 54 relative to the gate rotor until it reaches point 52 where it begins its cut and follows the solid line 55 until it leaves the trough. The generated contour of the troughs in the gate rotor may be held to a very close tolerance by controlling the distance between the axes of boring bar 31 and arbor 40, the distance between the points of the tool bits 49 and 50 and the radial extent of the tool bits.

The helix angle of the threads of the gate rotor 44 is controlled by the helix angle of the teeth on the pinion 35 on boring bar 31. Thus if the teeth on the pinion are straight, the threads formed on the rotor, as the blank is fed axially parallel with the boring bar 31, will be straight. With the helically formed teeth on the pinion 35, as shown, the same helix angle will be transferred to the threads of the rotor 44 as the blank is fed axially to the cutting tools on the boring head 36 parallel with respect to the boring bar 31 while the gear 43 and pinion 35 are in mesh.

For purpose of illustration, the drawings show mating rotors with four threads on the gate rotor and two threads on the main rotor, fixing the speed ratio of the main rotor and the gate rotor at two to one. Thus while the main rotor 45 is making two revolutions the gate rotor 44 is making one revolution. This ratio is maintained on the rotor machining fixture by having a two to one gear ratio between the helical pinion 35 and the helical gear 43 but the rotational ratio between the blank 44 and the boring head 36 is altered from the two to one gear ratio as the table 24 supporting the gear 43 and rotor blank 44 is moved to advance the gear 43 along the pinion 35 and the rotor blank 44 along the cutters to produce the helical thread form as hereinafter explained.

Figure 1:
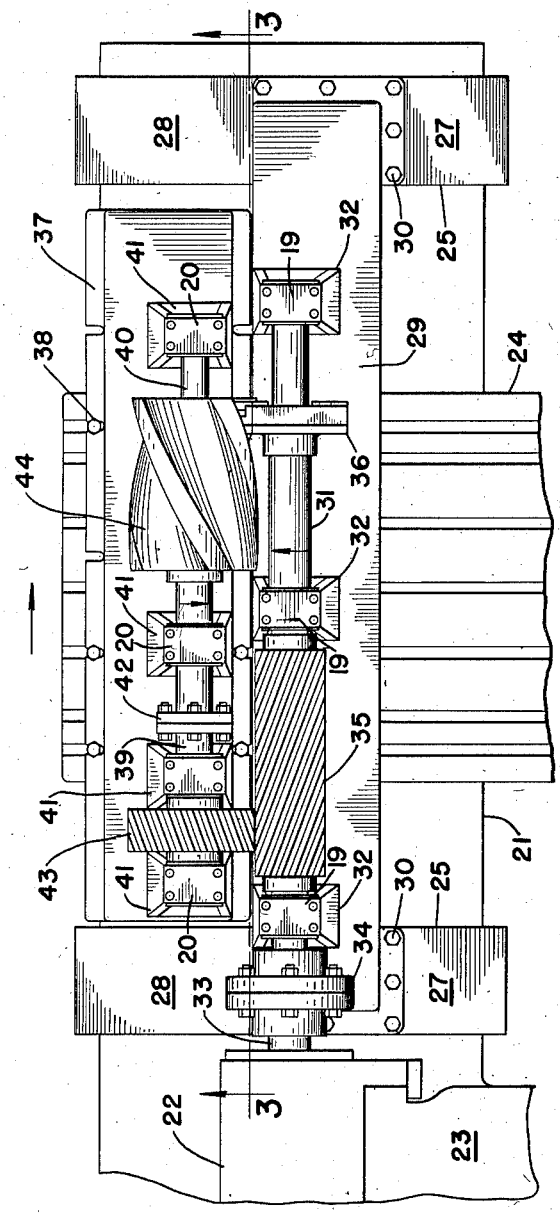
Figure 6:
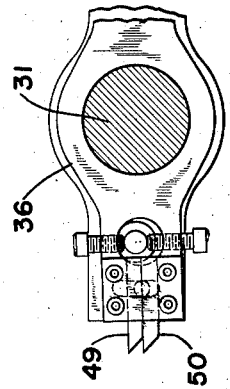
Figure 6 is a fragmentary side elevation of the boring head and cutting tools showing the cutting tool positioning means.
Figure 5:
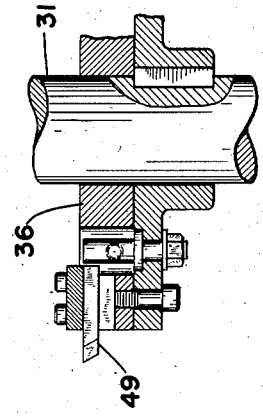
Figure 5 is a fragmentary sectional view taken through the boring head.
Figure 4:
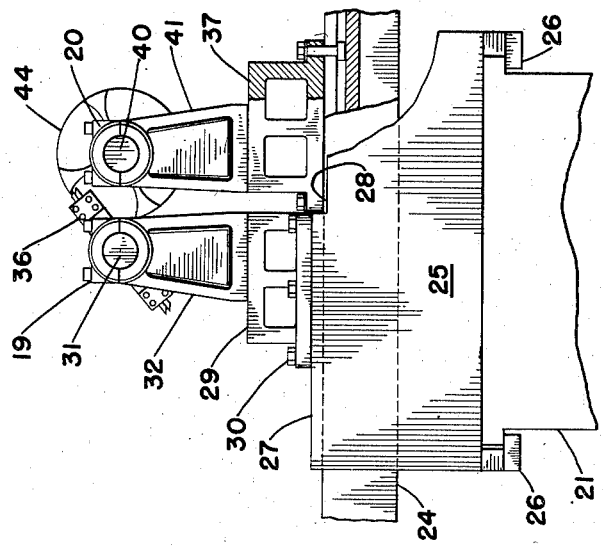
Figure 4 is a fragmentary end elevation of the structure shown in Figure 1, viewed from the right, with parts broken away and shown in section.

In operation, referring particularly to Figure 1, the rotor blank 44, on which the helical troughs are to be cut, is mounted on the arbor 40. The blank may be cast oversize to the approximate shape of the rotor member and then placed on the machine for cutting. In the case of the rotor blank shown, the helix angle of the troughs selected is such that for that length of rotor the troughs extend through 90°. The pinion 35 is then chosen to agree with the helix angle of the rotor troughs to be cut and a gear 43 that will mesh with pinion 35, the gear ratio between the gear and pinion being two to one.

Let it now be assumed that the boring bar 31 carrying the helical pinion 35 and the boring head 36 is rotating in the direction of the arrow, that the shaft and arbor 39, 40, carrying the helical gear 43 and the rotor blank 44, respectively, are rotating in the direction of the arrow, and that the longitudinal movement or feed of table 24 is in the direction of the arrow, that is, from left to right.

As the table 24 moves to the right, correspondingly advancing the rotor blank 44, the tools 49, 50 will generate the profile of the flanks of the rotor trough as previously described while the helical pinion 35 develops the helical thread form thereof.

This helical thread form results from a variation in the timing of the rotor blank 44 and the tool holder 36 from the one to two gear ratio of the gear 43 and pinion 35, due to the longitudinal travel of the gear 43 along the pinion 35. It is apparent that, with the table 24 and consequently the gear 43 and blank 44 moving to the right, and with the teeth of the gear 43 and pinion 35 cut in the direction shown, the rotational ratio of the tool holder 36 and gear blank 44 will be altered from the fixed one to two gear ratio between the gear 43 and pinion 35, so that the gear blank 44 will make a fraction more than two complete revolutions for each complete revolution of the tool holder 36. It follows that the cutter will start its cut of a particular rotor trough progressively sooner around the circumference of the blank 44 resulting in a helical thread form. The cutter must gain 90° on the rotor blank during the feeding across its length. Thus the amount that is gained over a one to two ratio depends upon the amount of feed per revolution, and the greater the feed the greater the increase in ratio. The device automatically compensates for variation in rate of feed, so that irrespective of the feed, the helix angle of the pinion 35 and the helix angle of the trough cut on the rotor blank remains the same.

If the cutting is performed while the blank is moving in the direction opposite that indicated in Figure 1, then the cutter will start its cut of a particular rotor trough progressively later around the circumference of the blank 44 since now the gear blank 44 will make a fraction less than two complete revolutions for each complete revolution of the tool holder 36, and the helical thread cut on the blank will be in the same direction as before.

Increasing or decreasing the feed speed of the table 24 relative to the rotational speed of the pinion 35 of tool holder 36 changes the rotational ratio between the rotor blank 44 and the tool holder 36, but does not alter the helix angle of the cut.

Figures 12 and 13 show a modified rotor machining fixture adapted to make a roughing cut and a finishing cut on the gate rotor blank simultaneously, with the rough and finish cutting tools in timed relation with the rotor blank so that they alternate in cutting the troughs whereby to distribute the load as evenly as possible for each revolution of the rotor blank. As shown in Figure 13 one set of tool bits is cutting a trough in the gate rotor blank while another set of tool bits is being turned to a position to begin a cut on the opposite gate rotor trough after the first cutter has finished its cut.

Cross supports 61 are clamped in position with clamp plates 62 on ways formed on horizontal boring mill bed 63. Boring bar support members 57 and 58 are bolted to pads 59 and 60 on cross supports 61 and clear the top of the movable table 64. Boring bars 65 and 66 are carried on brackets 67 and 68, respectively, over the support members 57 and 58. Boring bar 65 is connected to a spindle 69 in head stock 70 by a coupling 71. Mounted on boring bars 65 and 66 are helical pinions 72 and 73 and boring heads 74 and 75.

A rotor blank shaft support member 76 is carried on the movable table 64 adapted to move longitudinally between boring bar supports 57 and 58 and over the cross supports 61. The driven shaft and arbor 77 and 78 are carried on brackets 79 over the support member 76 and are connected by a coupling 80. Mounted on shaft 77 is helical gear 81 adapted to mate with helical pinions 72 and 73. Arbor 78 is formed to receive a gate rotor blank 82. The roughing cut tool carried by one boring head is timed to be out of its cut before the finishing cut is taken by the finishing cut tool carried by the other boring head.

Figure 14 shows a modified form of the gate rotor machining fixture of Figures 12 and 13 adapted to turn the outside diameter of a gate rotor by removing one of the boring bars and adding a tool post 83 with a cross slide 84 and a tool holder 85 in fixed relation to the boring head 86 to cut the outside diameter of the gate rotor while the boring head 86 is turning and getting into position to begin cutting a trough on the gate rotor.

Figure 15:
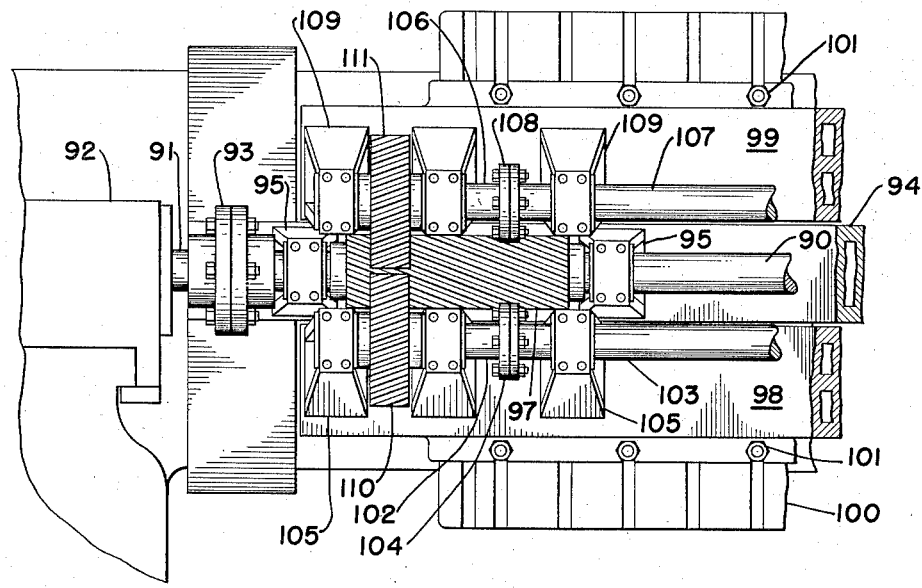
Figure 15 is a plan view of the drive arrangement for a modification of the invention for concurrently cutting the generated troughs of a pair of gate rotors in a single traverse of the blanks with respect to the cutting tools.
Figure 16:
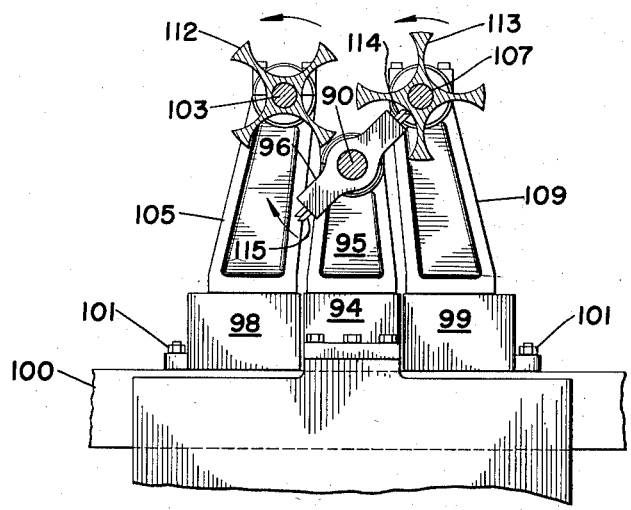
Figure 16 is an end elevation of the machine supplementing Figure 15, showing the arrangement of the rotor blanks and cutting tool.

Figures 15 and 16 show a modification of the gate rotor machining fixture for simultaneously cutting a pair of gate rotor blanks.

A boring bar 90 is connected to a drive spindle 91 in the boring head 92 of a horizontal boring mill by a coupling 93 and is carried over the stationary boring bar support member 94 by brackets 95. Mounted on the boring bar 90 is a boring head 96 and a helical pinion 97 having the same helix angle but opposite hand as the rotor threads to be cut.

A pair of rotor blank arbor support members 98 and 99 are carried on the movable table 100 at opposite sides of the boring bar support member 94 and are secured to the table with T-bolts 101. A driven shaft 102 and arbor 103, connected together by a coupling 104, are carried over the support member 98 on brackets 105 secured in any suitable manner on the support member 98. A second driven shaft 106 and arbor 107, connected together by a coupling 108, are carried over the support member 99 on brackets 109 secured in any suitable manner on the support member 99. Mounted on the shafts 102 and 106 are respective helical gears 110 and 111, adapted to mesh with the helical pinion 97 on the boring bar 90. The helical gears 110 and 111 have the same helical angle and are of the same hand as the rotor threads to be cut. Arbors 103 and 107 are formed to receive the respective gate rotor blanks 112 and 113 arranged to rotate in timed relation with respect to rotation of the boring head 96 in the same manner as rotor blank 44 and boring head 36 of the first described form of the invention.

The rotor blanks 112 and 113 are so disposed with respect to the boring head 96, that while, as shown in Figure 16, one set of cutter bits 114 is making a cut on rotor 113, the other set of cutter bits 115 is approaching a position to start making a cut on the rotor 112 after the cutter bits 114 have finished making a cut on the rotor 113.

In Figure 18, showing a novel machining fixture adapted for cutting the main rotor blank 135, aligned shaft 116 and arbor 117 connected by a coupling 118 are operatively connected with the drive spindle 119 in the boring head 120 by a coupling 121. The shaft 116 and arbor 117 are carried over the stationary support 122 by brackets 123. The main rotor blank 135 is rigidly secured on the arbor 117, and a helical pinion 124, of the same helix angle and hand as the threads to be cut on the rotor blank 135, is rigidly secured on the shaft 116.

A boring bar 125 is carried over the boring bar support 126 on brackets 127 and the support 126 is rigidly secured to the movable table 128 with T-bolts 129. Mounted on the boring bar 125 is a helical gear 130 having the same helix angle but opposite hand as the rotor threads to be cut, the gear 130 being arranged to mesh with the helical pinion 124 and to travel axially therealong as the table 128 is moved. Mounted to rotate with the boring bar 125 and in position for cutting the flanks of the main rotor blank 115 is the boring head 131. For cutting the generated flanks of the main rotor, the boring head 131 has cutter bits 132 provided with the cutting points 133, as best shown in Figures 22 and 23, which represent the opposite crest edges of a female rotor thread.

The boring head 131, as shown, takes the exact shape of the gate rotor and has the four pairs of cutting points 133 simulating the crest edges of the gate rotor. However, the shape of the boring head may be altered since the main rotor form is determined by the cutting points 133, but the boring head must be shaped so that it clears the main rotor form produced by the cutting points 133.

As previously explained, since the threads of the gate rotor and main rotor have a two to one ratio, the gear 43 and pinion 35, as shown in Figure 1, must also have the same ratio, and in cutting the gate rotor, they are arranged to rotate the gate rotor blank 44 slower than the boring head 36. When cutting the main rotor the converse is true, that is, the main rotor blank 135 must be rotated faster than the cutting tool 131, so that the positions of the pinion and gear with respect to the blank and cutting tool are reversed.

If the edge of the cutting tool is moving faster than the surface of the work at the point of engagement of the tool with the work, then the surface generated will be concave as in cutting the gate rotor. Thus, referring to Figures 8, 9 and 10, every point on the gate rotor from the bottom of the trough outwardly along the flanks to the crest is moving slower than the cutting tool so that the flanks are concavely formed.

On the other hand, if the edge of the cutting tool is moving slower than the surface of the work at the point of engagement of the tool with the work, then the surface generated will be convex as in cutting the main rotor. Thus, referring to Figures 19, 20 and 21, every point on the main rotor from the hub 136 outwardly along the flanks to the crest is moving faster than the cutting tool so that the flanks are convexly formed.

Since the hub 136 is on the pitch circle of the main rotor and the radius of the cutting tool is on the pitch circle of the gate rotor, the speed of the cutting tool is the same as any of the points around the hub 136, so that the cutting tool rolls over the hub 136. Therefore, it is desirable, before cutting the generated flanks of the main rotor, to first machine the hub 136 of the oversize main rotor blank.

However, it is possible to eliminate the preliminary machining of the hub 136 under certain circumstances. In rolling over the hub portion of the main rotor blank, the radial edge of the tool will penetrate the excess metal of the blank down to the rotor hub and if the feed is not excessive and the metal is sufficiently brittle it will flake off.

Figures 19, 20 and 21 diagrammatically show the cutting tool 131 and the main rotor blank 135 in various relative positions during the generating cut, Figure 19 showing the relative position of the tool and rotor blank at the beginning of a generating cut, Figure 20 midway of the cut and Figure 21 at the end of a generating cut.

Figure 24 shows a modified rotor machining fixture adapted for simultaneously cutting a main rotor and a gate rotor. This machining fixture is a composite of the gate rotor machining fixture of Figures 1, 2 and 3 and the main rotor machining fixture of Figure 18.

The boring bar or shaft 140 corresponding to the boring bar 31 of Figure 1, carries a helical pinion 141 and boring head 142 identical in all respects with pinion 35 and boring head 36 of Figure 1. Boring bar 140 is provided with an axially aligned shaft extension 143 supported on the support member 144 by brackets 145. A coupling 146 connects boring bar 140 and shaft extension 143. A main rotor blank 147 is mounted on shaft extension 143 for rotation therewith.

A driven shaft 148 and shaft or arbor 149 connected together by a coupling 150 are carried by a support member 151 by brackets 152 and the support member 151 is secured to the movable feed table 153, in the same manner as the corresponding parts of Figure 1 are arranged. Mounted on shaft 148 is a helical gear 154 adapted to mesh with the pinion 141 and mounted on arbor 149 is a gate rotor blank 155 in position for machining by the boring head 142.

A shaft 156 in axial alignment with arbor 149 and connected thereto by a coupling 157 is supported on the support member 151 by brackets 158. Mounted on shaft 156 for rotation therewith is a boring head 159, identical with the boring head 131 shown in the main rotor machining fixture of Figure 18.

In operation boring head 142 machines the gate rotor blank 155 and simultaneously the boring head 159 machines the main rotor blank 147.

I claim:
1. In a machine for generating on a blank the flanks of one of a pair of complementary helical rotors the threads of which have continuous crests with defined edges, the combination of a pair of parallel axially aligned shafts, means for continuously rotating one of said shafts, intermeshing helical gears rigidly secured to said shafts fixed thereon against relative axial movement with respect thereto for continuously rotating the other of said shafts and maintaining rotation of said shafts in correlated timed relation, the helix angle of said gears being the same as the desired helix angle of the complementary rotors at their pitch circles, a rotor blank rigidly and coaxially mounted on one of said shafts for rotation therewith, a tool holder rigidly mounted on the other of said shafts for rotation therewith carrying a leading and trailing point cutter in position for engaging said blank, said cutters being disposed in a common plane at right angles with respect to the axis of said tool carrying shaft and disposed in circumferential spaced relation to simulate the crest edges of a rotor complementary to the rotor being cut, said leading and trailing cutters each cutting transversely across the face of said blank on each revolution of said tool holder shaft, and respectively generating opposite rotor flanks, and means for imparting to said shafts together with the blank and tool holder and engaging helical gears supported thereon relative endwise axial parallel movement while rotating said shafts, said endwise movement constituting the feed of the blank relative to said cutters, and said endwise movement of one of the meshed rotating helical gears with respect to the other meshed rotating helical gear effects a constant change in the phase relation of the cutters with respect to the periphery of the blank to provide a helical thread on the face of the blank.

2. In a machine for generating on a blank the flanks of one of a pair of complementary helical rotors the threads of which have continuous crests with defined edges, the combination of a pair of parallel axially aligned shafts, a rotor blank rigidly and coaxially mounted on one of said shafts, a cutting tool rigidly mounted on the other of said shafts for engagement with said blank, means including a helical gear rigidly mounted on each of said shafts fixed thereon against relative axial movement with respect thereto in meshing engagement for simultaneously and continuously rotating said shafts in opposite directions at speeds for imparting to the tool a cutting action on the blank, said cutting tool carrying a leading and trailing point cutter disposed for orbital movement about the axis of said tool carrying shaft for intermittent cutting engagement with the blank, said cutters being disposed in a common plane at right angles with respect to the axis of said tool carrying shaft and disposed in circumferential spaced relation to simulate the crest edges of a rotor complementary to the rotor being cut, said leading and trailing cutters each cutting transversely across the face of said blank on each revolution of said tool carrying shaft, and respectively generating opposite rotor flanks, and means for imparting to said shafts together with the blank and tool and engaging helical gears supported thereon relative endwise axial parallel movement while rotating said shafts, said endwise movement constituting the feed of the blank relative to said cutters, and said endwise movement of one of the meshed rotating helical gears with respect to the other meshed rotating helical gear effects a constant change in the phase relation of the cutters with respect to the periphery of the blank to provide a helical thread on the face of the blank.

3. A construction in accordance with claim 2, wherein the gear ratio of said helical gears is such as to bring said cutters and blank in cutting engagement a plurality of times during each complete rotation of said blank whereby said cutters cut a plurality of threads on said blank during one traverse of said cutters lengthwise with respect to said blank.

4. A construction in accordance with claim 2 in which the ratio between said helical gears is in the relation of small whole numbers.

References Cited in the file of this patent

UNITED STATES PATENTS

| Number | Name | Date |
|---|---|---|
| 281,820 | Albro | July 24, 1883 |
| 320,968 | Richards | June 30, 1885 |
| 469,813 | Dahlgren et al. | Mar. 1, 1892 |
| 492,966 | Nutt | Mar. 7, 1893 |
| 883,133 | Green | Mar. 24, 1908 |
| 1,103,851 | Sykes | July 14, 1914 |
| 1,983,019 | DeLeeuw | Dec. 4, 1934 |
| 1,997,228 | Nichols | Apr. 9, 1935 |
| 2,075,469 | Reidinger et al. | Mar. 30, 1937 |
| 2,174,522 | Lysholm | Oct. 3, 1939 |
| 2,236,256 | Allard | Mar. 25, 1941 |
| 2,287,716 | Whitfield | June 23, 1942 |
| 2,473,233 | Whitfield | June 14, 1949 |
| 2,528,242 | Praeg | Oct. 31, 1950 |

FOREIGN PATENTS

| Number | Country | Date |
|---|---|---|
| 739,487 | France | Oct. 25, 1932 |